United States Patent
Yamasaki et al.

(10) Patent No.: US 7,501,176 B2
(45) Date of Patent: Mar. 10, 2009

(54) HIGHLY MOISTURE PROOF FILM AND METHOD OF MANUFACTURING THE SAME

(75) Inventors: Masahiro Yamasaki, Omitama (JP); Yusaku Inaba, Omitama (JP); Hideaki Tanaka, Omitama (JP)

(73) Assignee: Kureha Corporation, Tokyo (JP)

(*) Notice: Subject to any disclaimer, the term of this patent is extended or adjusted under 35 U.S.C. 154(b) by 214 days.

(21) Appl. No.: 10/576,877

(22) PCT Filed: Oct. 19, 2004

(86) PCT No.: PCT/JP2004/015758

§ 371 (c)(1),
(2), (4) Date: Apr. 21, 2006

(87) PCT Pub. No.: WO2005/037898

PCT Pub. Date: Apr. 28, 2005

(65) Prior Publication Data

US 2007/0134507 A1    Jun. 14, 2007

(30) Foreign Application Priority Data

Oct. 22, 2003   (JP) ............................. 2003-362529

(51) Int. Cl.
*B32B 27/32* (2006.01)
*B32B 27/00* (2006.01)
*B05D 1/40* (2006.01)
*B05D 3/02* (2006.01)
*B05D 3/00* (2006.01)

(52) U.S. Cl. ........................ 428/220; 428/332; 428/500; 427/331; 427/372.2; 427/532; 427/541

(58) Field of Classification Search ........................ None
See application file for complete search history.

(56) References Cited

U.S. PATENT DOCUMENTS 4,163,702 A * 8/1979 Rickert, Jr. ................... 204/488
6,605,344 B1   8/2003 Ohba et al.

FOREIGN PATENT DOCUMENTS

| JP | 05-251660 | 7/1993 |
| JP | 09-256216 | 5/1997 |
| JP | 09-185297 | 10/1997 |
| JP | 2002-098564 | 1/2002 |
| JP | 2003-289704 | 8/2003 |
| JP | 2003-289705 | 8/2003 |
| WO | WO 99/52973 | 4/1999 |
| WO | WO 03/091317 A1 | 6/2003 |

* cited by examiner

*Primary Examiner*—Sheeba Ahmed
(74) *Attorney, Agent, or Firm*—Reed Smith LLP; Juan Carlos A. Marquez, Esq.

(57) ABSTRACT

The present invention makes it possible to provide a film exhibiting an excellent oxygen-gas barrier properties and an excellent moisture proofness, the film containing at least a multivalent metal salt of a polycarboxylate-based polymer (A), the film having the density which is not lower than 1.80 g/cm$^3$; the surface ratio α [the peak surface $S_1$ (3700 to 2500 cm$^{-1}$)/the peak surface $S_2$ (1800 to 1500 cm$^{-1}$)] of an infrared absorption spectrum which is not larger than 2.5; and the peak ratio β [the peak $A_1$ (1560 cm$^{-1}$)/the peak $A_2$ (1700 cm$^{-1}$)] of the infrared absorption spectrum which is not smaller than 1.2, by means of applying a solution containing the polycarboxylate-based polymer (A) and the multivalent metal compound (B) to a substrate, thus obtaining a dried film, and thereafter treating the dried film with heat under predetermined conditions. Accordingly, the present invention makes it possible to provide packaging materials and packaging containers for not only foods which are required not to contact an oxygen gas, but also foods, beverages, chemicals, pharmaceuticals, and precision metal parts such as electronic parts, as well as members of electronic equipment, all of which are required to be protected from moisture.

9 Claims, No Drawings

HIGHLY MOISTURE PROOF FILM AND METHOD OF MANUFACTURING THE SAME

TECHNICAL FIELD

The present invention relates to a film, which includes at least a multivalent metal salt of a polycarboxylate-based polymer, and which has a high density. More specifically, the present invention relates to a film which has a density not lower than 1.80 g/cm$^3$, an surface ratio α of infrared absorption spectrum not higher than 2.5 [a peak surface $S_1$ (3700 to 2500 cm$^{-1}$)/a peak surface $S_2$ (1800 to 1500 cm$^{-1}$)] and a peak ratio β of infrared absorption spectrum not lower than 1.2 [(a peak $A_1$ (1560 cm$^{-1}$)/a peak $A_2$ (1700 cm$^{-1}$)], and which exhibits excellent oxygen-gas barrier properties and high moisture proofness, and relates to a method of manufacturing the film.

Consequently, with regard to their application, the film according to the present invention and a laminate made of the film are suitable as packaging materials for foods, beverages, chemicals, pharmaceuticals, and precision metal parts such as electronic parts, as well as materials for members of electronic equipment and packaging containers, all of which are susceptible to deterioration stemming from influence of oxygen, and all of which need to be protected from moisture. In addition, the film according to the present invention and the laminate of the film can be suitably used as packaging materials for articles which require stable oxygen-gas barrier properties for a long time, and which need to be treated under conditions of high-temperature hot water, including boil and retort sterilization. Moreover, the film and the laminate of the film can be suitably used as packaging materials for electronic parts which require moisture proofness.

BACKGROUND OF THE INVENTION

Polymers containing highly hydrophilic hydrogen bonding groups in molecules, which polymers are represented by poly (meth)acrylic acid and polyvinyl alcohol, have been publicly known as gas barrier polymers. With regard to films made up solely of such polymers, however, their gas barrier properties against oxygen and the like is deteriorated due to their hydrophilicity under high humidity conditions, although the gas barrier properties against oxygen and the like is excellent under a dry condition. Furthermore, films made up solely of such polymers have problems with resistance against humidity and hot water, and the problems include dissolution of them in hot water. The problems impose restrictions on industrial use of these polymers as gas barrier resin.

In order to solve the problems, Patent Literature 1 (claim 1 of Japanese Patent Laid-open Official Gazette No. Hei. 10-237180) has proposed a gas barrier resin composition which is characterized by including, in its chemical structure, ester bonds formed by reaction between poly(meth)acrylic acid and polyalcohol as well as ionic bonds formed by reaction between poly(meth)acrylic acid and multivalent metal ions. Patent Literature 1 has disclosed that limitation of the ratio between the ester bond and the ionic bond in a specific range makes it possible to obtain a gas barrier film with resistance against high-temperature water vapor and hot water. Furthermore, Patent Literature 1 has disclosed a method of forming ester bonds between poly(meth)acrylic acid and polyalcohol by means of heat treatment, and a method of forming ionic bonds between poly(meth)acrylic acid and multivalent metal ions by means of further dipping a mixture of poly(meth)acrylic acid and polyalcohol, which has been treated with heat, into water containing a multivalent metal compound.

Moreover, Patent Literature 2 (claim 1 of Japanese Patent Application No. Hei. 2002-121246) has disclosed a film whose raw materials are a polycarboxylate-based polymer (A) and a multivalent metal compound (B), and which has a peak ratio ($A_{1560}/A_{1700}$) of infrared absorption spectrum not lower than 0.25.

According to Patent Literature 1, however, in order to fully develop oxygen-gas barrier properties and resistance against high-temperature water vapor and hot water, a mixture of a poly(meth)acrylic acid polymer and a polyalcohol polymer needs to be denatured by means of process operations including heat treatment. If the mixture is not fully denatured, this makes it difficult to obtain resistance against high-temperature water vapor and hot water, or moisture proofness, although existence of the polyalcohol in the mixture enables excellent gas barrier properties to be obtained. With regard to the film disclosed by Patent Literature 2, improvement in the moisture proofness is further desired, although excellent gas barrier properties are obtained. Heretofore, metals, metallic foils, glass and the like have been used as moisture-proof materials and highly moisture-proof materials in particular. However, application of plastic materials has been anticipated for electronic parts, members of electronic equipment and the like, and packaging materials for them, with transparency and flexibility of the plastic materials taken into consideration. Particularly, development of plastic materials with moisture proofness and a gas barrier against oxygen has been awaited.

An object of the present invention is to provide a film, which includes at least a multivalent metal salt of a polycarboxylate-based polymer (A), and which has moisture proofness along with oxygen-gas barrier properties, and is to provide a method of manufacturing

DISCLOSURE OF THE INVENTION

The present inventors have eagerly examined whether or not drastic improvement in oxygen-gas barrier properties and moisture proofness can be achieved by use of a film including at least a multivalent metal salt of a polycarboxylate-based polymer (A) by means of highly densifying structures of the polymer molecules through reducing to an extreme extent water stemming from formation of a salt between a hydrophilic group of the polycarboxylate-based polymer (A) and the multivalent metal. As a result, the present inventors have found the followings. If a dried film obtained by coating a film with a solution including the polycarboxylate-based polymer (A) and the multivalent metal salt (B) is treated with heat under predetermined conditions, water in the film is removed, and resultantly a film with a highly dense structure can be obtained. The film thus obtained has excellent oxygen-gas barrier properties and moisture proofness. Accordingly, the present invention has been completed.

Specifically, a first aspect of the present invention provides a film, which includes at least a multivalent metal salt of a polycarboxylate-based polymer (A), and which has a density not lower than 1.80 g/cm$^3$, an surface ratio α [a peak surface $S_1$ (3700 to 2500 cm$^{-1}$)/a peak surface $S_2$ (1800 to 1500 cm$^{-1}$)] of infrared absorption spectrum not higher than 2.5, and a peak ratio β [a peak $A_1$ (1560 cm$^{-1}$)/a peak $A_2$ (1700 cm$^{-1}$)] of infrared absorption spectrum not lower than 1.2.

A second aspect of the present invention provides the film according to the first aspect of the present invention, which includes a multivalent metal in an amount which is not smaller than 0.5 chemical equivalents relative to all the carboxyl groups contained in the polycarboxylate-based polymer (A).

A third aspect of the present invention provides the film according to any one of the first and second aspects of the present invention, wherein the polycarboxylate-based polymer (A) is any one of a homopolymer, a copolymer, and a mixture of the homopolymer and the copolymer, which contains at least one type of polymerizable monomer selected from the group consisting of acrylic acid, maleic acid and methacrylic acid.

A fourth aspect of the present invention provides the film according to any one of the first to third aspects of the present invention, wherein the multivalent metal is a divalent metal.

A fifth aspect of the present invention provides the film according to any one of the first to fourth aspects of the present invention, wherein the water vapor permeability is not higher than 15 g/m²·day (at 40° C. and at a relative humidity of 90%).

A sixth aspect of the present invention provides the film according to any one of the first to fifth aspects of the present invention, wherein the oxygen permeability is not higher than 1000 cm³ (STP)/(m²·day·MPa) (at 30° C. and at a relative humidity of 80%).

A seventh aspect of the present invention provides a laminate which is obtained by arranging the film according to any one of the first to sixth aspects of the present invention in at least one surface of a substrate.

An eighth aspect of the present invention provides a method of manufacturing a film which has an surface ratio α [a peak surface $S_1$ (3700 to 2500 $cm^{-1}$)/a peak surface $S_2$ (1800 to 1500 $cm^{-1}$)] of infrared absorption spectrum not higher than 2.5, and a peak ratio β [(a peak $A_1$ (1560 $cm^{-1}$)/a peak $A_2$ (1700 $cm^{-1}$)] of infrared absorption spectrum not lower than 1.2, and a density not lower than 1.80 g/cm³. The method is comprised the steps of: applying, to a substrate, any one of a solution and a dispersant (coating liquid) of a mixture containing a polycarboxylate-based polymer (A), a multivalent metal compound (B), any one of a volatile base (C) and an acid (D), and a solvent; thus forming a film; and thereafter treating the film with heat at a temperature in a range of 60° C. to 400° C. while being putted together with the substrate or while being separated from the substrate.

A ninth aspect of the present invention provides the method of manufacturing a film according to the eighth aspect of the present invention, wherein the multivalent metal compound (B) is added in an amount which is not smaller than 0.5 chemical equivalents relative to all the carboxyl groups contained in the polycarboxylate-based polymer (A).

A tenth aspect of the present invention provides the method of manufacturing a film according to any one of the eighth to ninth aspects of the present invention, wherein the polycarboxylate-based polymer (A) is a homopolymer, a copolymer, or a mixture of the homopolymer and the copolymer, which contains at least one type of polymerizable monomer selected from the group consisting of acrylic acid, maleic acid and methacrylic acid.

An eleventh aspect of the present invention provides the method of manufacturing a film according to any one of the eighth to tenth aspects of the present invention, wherein the multivalent metal compound (B) is a divalent metal compound.

BEST MODES FOR CARRYING OUT THE INVENTION

Hereinafter, detailed descriptions will be provided for the present invention.

A film according to the present invention is a film which has oxygen-gas barrier properties and moisture proofness. The film is characterized by including at least a multivalent metal salt of a polycarboxylate-based polymer (A), and by having a density not lower than 1.80 g/cm³, an surface ratio α of infrared absorption spectrum not higher than 2.5 [a peak surface $S_1$ (3700 to 2500 $cm^{-1}$)/a peak surface $S_2$ (1800 to 1500 $cm^{-1}$)] and a peak ratio β of infrared absorption spectrum not lower than 1.2 [(a peak $A_1$ (1560 $cm^{-1}$)/a peak $A_2$ (1700 $cm^{-1}$)]. Incidentally, the aforementioned surface ratio will be sometimes referred to simply as the "surface ratio α of infrared absorption spectrum," or more simply as the "surface ratio α," while the present invention will be described. In addition, the aforementioned peak ratio will be sometimes referred to simply as the "peak ratio β of infrared absorption spectrum," or more simply as the "peak ratio β".

It should be noted that the oxygen-gas barrier properties which is referred to as while the present invention is described means low oxygen permeability which is exhibited under high humidity conditions. The oxygen-gas barrier properties means the oxygen permeability exhibited at 30° C. at a relative humidity (RH) of 80%, unless mentioned otherwise.

In a case where the polycarboxylate-based polymer (A) used in the present invention satisfies a specific condition in a desirable manner, the film according to the present invention in particular exhibits, even under high humidity conditions, excellent gas barrier properties against oxygen and the like, and has resistance against neutral water, high-temperature water vapor and hot water.

The "specific condition" means that a coefficient of the oxygen permeability of the film made solely of the polycarboxylate-based polymer (A) which is the raw material for the film according to the present invention takes on a value not larger than a specific value under a dry condition (at a temperature of 30° C. and at a relative humidity of 0%). The "coefficient of the oxygen permeability" as herein referred to is expressed by multiplying a measured value of the oxygen permeability by the film thickness. The coefficient of the oxygen permeability represents the oxygen-gas barrier properties intrinsic to the polycarboxylate-based polymer (A) irrespectively of the film thickness. In this respect, the reason why the dry condition is used for a condition under which the oxygen permeability is measured is that the coefficient of the oxygen permeability of the film made solely of the polycarboxylate-based polymer (A) varies depending on the influence of the relative humidity. The "dry condition" means that the sample is dried at a relative humidity of 0%. Doing so makes it possible to represent the intrinsic value of the polycarboxylate-based polymer (A) used for the present invention. A coefficient of a gas permeability of a polymer is influenced by the molecular structure and physical conditions of the polymer, the type of a gas, and an atmosphere in which the gas permeability is measured. Consequently, limitation of the type of a gas, an atmosphere in which a gas permeability is measured, and a method of preparing a polymer film makes it possible to adopt a coefficient of the gas permeability as a variable reflecting the structure of the polymer. For a relationship between molecular structures of polymers and coefficients of gas permeabilities, please be advised to see *Encyclopedia of Polymer Science and Engineering*, Vol. 2, p. 177, John Wiley & Sons, New York, 1985.

No specific restrictions are imposed on the polycarboxylate-based polymer (A) used as the raw material in the case of the present invention, as long as the polycarboxylate-based polymer (A) is a conventional polycarboxylate-based polymer. From the viewpoint of oxygen-gas barrier properties and stability against high-temperature water vapor and hot water of the film of the present invention, with regard to the polycarboxylate-based polymer (A) used as the raw material, it is desirable that the coefficient of the oxygen permeability obtained by measuring the film-shaped product of the polycarboxylate-based polymer (A) under the dry condition (at 30° C. at the relative humidity of 0%) be not larger than 1000 $cm^3$ (STP)·μm/($m^2$·day·MPa). It is more desirable that the coefficient be not larger than 500 $cm^3$ (STP)·μm/($m^2$·day·MPa). It is the most desirable that the coefficient be not larger than 100 $cm^3$ (STP)·μm/($m^2$·day·MPa).

The coefficient of the oxygen permeability can be figured out, for example, by use of the following method.

First of all, the polycarboxylate-based polymer (A) is dissolved in water, and thereby an aqueous solution containing 10 weight percent of the polycarboxylate-based polymer (A) is prepared. Then, the aqueous solution thus prepared is applied onto a substrate made of a plastic by use of a bar coater, and is dried. Thereby, a coating film on which a 1 μm-thick layer of the polycarboxylate-based polymer is formed is prepared. The coating film thus obtained is dried, and the oxygen permeability is measured at 30° C. at the relative humidity of 0%. At this point, an arbitrary plastic film having an already-known oxygen permeability is used as the plastic substrate. If the oxygen permeability of the coating film of the polycarboxylate-based polymer (A) thus obtained is not larger than one tenth of the oxygen permeability solely of the plastic film used as the substrate, a measured value of the oxygen permeability of the coating film can be virtually regarded as the oxygen permeability solely of the layer of the polycarboxylate-based polymer (A).

Since the value thus found represents the oxygen permeability of the 1 μm-thick layer of the polycarboxylate-based polymer (A), the value can be converted to the coefficient of the oxygen permeability by means of multiplying the value by the thickness of 1 μm. In addition, the oxygen permeability can be measured by use of, for example, OX-TRAN™ Model 2/20, which is an oxygen permeation instrument made by MOCON Inc. The method of measuring oxygen permeability is governed by B method (an equal-pressure method) of JIS K-7126 and ASTM D3985-81, and a measured value is denominated by a unit of $cm^3$ (STP)/($m^2$·day·MPa). In this respect, "(STP)" means standard conditions (0° C. and 1 atm) for specifying the volume of oxygen.

Existing polycarboxylate-based polymers can be used as the polycarboxylate-based polymer (A) to be used in the case of the present invention. The term "existing polycarboxylate-based polymers" is a generic designation of polymers, each of which includes two or more carboxyl groups in its molecule. Specifically, the followings can be taken as an example of the polycarboxylate-based polymers: homopolymers formed from an α,β-monoethylenic unsaturated carboxylic acid serving as a polymerizable monomer; copolymers formed solely from α,β-monoethylenic unsaturated carboxylic acids serving as monomer components and containing at least two types of these components; copolymers formed from an α,β-monoethylenic unsaturated carboxylic acid monomer and another ethylenic unsaturated monomer; and acidic polysaccharides including in the molecules a carboxyl group, such as alginic acid, carboxymethyl cellulose, pectin and the like. These polycarboxylate-based polymers (A) can be used singly or in combination of at least two types of them.

In this respect, typical examples of the α,β-monoethylenic unsaturated carboxylic acid include acrylic acid, methacrylic acid, itaconic acid, maleic acid, fumaric acid, crotonic acid and the like. In addition, typical examples of the ethylenic unsaturated monomer capable of being copolymerized with such an α,β-monoethylenic unsaturated carboxylic acid include ethylene, propylene, saturated carboxylic acid vinyl esters such as vinyl acetate and the like, alkyl acrylates, alkyl methacrylates, alkyl itaconates, acrylonitrile, vinyl chloride, vinylidene chloride, vinyl fluoride, vinylidene fluoride, styrene and the like. In a case where the polycarboxylate-based polymer (A) is a copolymer formed from an α,β-monoethylenic unsaturated carboxylic acid and one of saturated carboxylic acid vinyl esters such as vinyl acetate and the like, the copolymer can be used by converting the saturated carboxylic acid vinyl ester moiety to vinyl alcohol through saponification of the copolymer.

Furthermore, in a case where the polycarboxylate-based polymer (A) used in the present invention is a copolymer formed from an α,β-monoethylenic unsaturated carboxylic acid and an ethylenic unsaturated monomer, it is desirable that, with regard to the copolymer composition, the compositional proportion of the α,β-monoethylenic unsaturated carboxylic acid monomer in the copolymer be not smaller than 60 mol % from viewpoints of the oxygen-gas barrier properties and the resistance against high-temperature water vapor and hot water according to the present invention. It is more desirable that the compositional proportion be not smaller than 80 mol %. It is far more desirable that the compositional portion be not smaller than 90 mol %. It is the most desirable that the compositional portion be 100 mol %, that is, that the polycarboxylate-based polymer (A) is a polymer formed solely from the α,β-monoethylenic unsaturated carboxylic acid. Moreover, in a case where the polycarboxylate-based polymer (A) is a polymer formed solely from the α,β-monoethylenic unsaturated carboxylic acid, specific desirable examples of the polycarboxylate-based polymer (A) include polymers formed through polymerization of at least one type of polymerizable monomer selected from the group consisting of acrylic acid, methacrylic acid, itaconic acid, maleic acid, fumaric acid and crotonic acid, as well as mixtures of such polymers. It is more desirable that a polymer formed through polymerization of at least one type of polymerizable monomer selected from the group consisting of acrylic acid, methacrylic acid and maleic acid, or a mixture of such polymers be able to be used. It is the most desirable that polyacrylic acid, polymethacrylic acid, polymaleic acid and mixtures of the acids be able to be used. In a case where the polycarboxylate-based polymer (A) is other than a polymer formed from the α,β-monoethylenic unsaturated carboxylic acid monomer, and is, for example, an acidic polysaccharide, it is desirable that alginic acid be able to be used.

No specific restrictions are imposed on the number average molecular weight of the polycarboxylate-based polymer (A). From a viewpoint of the film formability, however, it is desirable that the number average molecular weight be in a range of 2,000 to 10,000,000. It is more desirable that the number average molecular weight be in a range of 5,000 to 1,000,000.

As a polymer constituting the film according to the present invention, a polymer other than the polycarboxylate-based polymer (A) can be used while being mixed with the polycarboxylate-based polymer (A) as long as neither the oxygen-gas barrier properties nor the moisture proofness of the film is impaired. However, it is desirable that the polycarboxylate-based polymer (A) be used solely.

Types of multivalent metals in the multivalent metal compound (B) used in the present invention are a multivalent metal element whose metal ions have two or more valencies, and a compound of such a multivalent metal element. Specific example of the multivalent metal include alkaline earth metals such as beryllium, magnesium calcium and the like; transition metals such as titanium, zirconium, chromium, manganese, iron, cobalt, nickel, copper zinc and the like; and aluminum. Specific examples of the multivalent metal compound (B) include oxides, hydroxides, carbonates, organic acid salts and inorganic acid salts of the aforementioned multivalent metals; ammonium complexes of the multivalent metals; secondary to quaternary amine complexes of the multivalent metals; and carbonates and organic acid salts of such complexes. Examples of the organic acid salts include acetates, oxalates, citrates, lactates, phosphates, phosphites, hypophosphites, stearates and monoethylenic unsaturated carboxylic acid salts. Examples of the inorganic acid salts include chlorides, sulfates nitrates and the like. Other examples of the multivalent metal compound (B) include alkyl alkoxides of the aforementioned multivalent metals.

These multivalent metal compounds (B) can be used singly or in combination of at least two types of them. It is desirable that, out of these multivalent metal compounds (B), a divalent metal compound be used as the multivalent metal compound (B) used in the present invention, from viewpoints of the gas barrier properties and moisture proofness of the film according to the present invention as well as easiness to manufacture the film according to the present invention. It is more desirable that any one of the followings can be used as the multivalent metal compound (B) used in the present invention: an oxide, hydroxide or carbonate of an alkaline earth metal, zirconium, cobalt, nickel, copper or zinc; an ammonium complex of any one of the aforementioned metals; and a carbonate of such a complex. It is far more desirable that any one of the followings can be used as the multivalent metal compound (B): an oxide, hydroxide, or carbonate of magnesium, calcium, copper or zinc; an ammonium complex of copper or zinc; and a carbonate of such a complex.

Furthermore, a metal compound formed from a monovalent metal, for example, a monovalent metal salt of the polycarboxylate-based polymer (A) can be used while being mixed with, or contained in, the film according to the present invention, as long as neither the oxygen-gas barrier properties nor the moisture proofness of the film according to the present invention is impaired. With regard to the amount of monovalent metal compound to be added, it is desirable that the chemical equivalent of the monovalent metal compound relative to the carboxyl groups of the polycarboxylate-based polymer (A) be not larger than 0.2, from viewpoints of the oxygen-gas barrier properties and the moisture proofness of the film according to the present invention. The monovalent metal compound may be partially contained in the molecule of a multivalent metal salt of the polycarboxylate-based polymer.

No specific restrictions are imposed on the form of the multivalent metal compound (B). As described below, however, in the film according to the present invention, parts or all of the multivalent metal compound (B) and carboxyl groups of the polycarboxylate-based polymer (A) forms a salt through ionic bond.

For this reason, it is desirable that the multivalent metal compound (B) be in the form of particles, and that the particle sizes be smaller, from a viewpoint of transparency of the film according to the present invention, in a case where the film contains parts of the multivalent metal compound (B) which do not participate in formation of a carboxylic acid salt. Moreover, it is desirable that the multivalent metal compound be in the form of particles, and that the particle sizes be smaller, from a viewpoint that the below-described coating mixture for forming the film according to the present invention is prepared efficiently, and from a viewpoint that a more homogeneous coating mixture is obtained. It is desirable that the average particle size of the multivalent metal compound be not larger than 5 μm. It is more desirable that the average particle size be not larger than 1 μm, and it is the most desirable that the average particle size be not larger than 0.1 μm.

In the case of the film according to the present invention, it is desirable that, with regard to the amount of the multivalent metal compound (B) versus the amount of the polycarboxylate-based polymer (A), the chemical equivalent of the multivalent metal compound (B) relative to all the carboxyl groups contained in the polycarboxylate-based polymer (A) be not smaller than 0.5 from the viewpoints of the oxygen-gas barrier properties and the moisture proofness of the film. It is more desirable that the chemical equivalent be not smaller than 0.8. In addition, from the viewpoints of easiness to manufacture the film and transparency of the film, it is desirable that the chemical equivalent be not larger than 10. Furthermore, it is the most desirable that the chemical equivalent be in a range from 1 to 5. In this respect, a "chemical equivalent" represents a fixed amount of an element (a simple substance) or compound which is determined on the basis of its chemical reactivity. A "chemical equivalent" in the case of the present invention represents a chemical equivalent of an element or a compound relative to a total amount of carboxyl groups contained in the polycarboxylate-based polymer (A). For this reason, one chemical equivalent of base means an amount of base which neutralizes an equivalent of carboxyl group acting as an acid. At this point, a base includes multivalent metal constituting the multivalent metal compound (B).

As described above, the film according to the present invention is characterized by including at least a multivalent metal salt of the polycarboxylate-based polymer (A), by having the density not lower than 1.80 g/cm$^3$, and by having the surface ratio α not larger than 2.5 and the peak ratio β not smaller than 1.2, which ratios are obtained by measuring a specific range in the infrared absorption spectrum. The film according to the present invention which has such characteristics is a film having the satisfactory oxygen-gas barrier properties and moisture proofness. With regard to the development of the oxygen-gas barrier properties and the moisture proofness, it has not been fully unraveled how the surface ratio α and the peak ratio β, which are obtained by measuring the specific range of the infrared absorption spectrum, and the density of the film are related to the structure of the polymer molecule constituting the film according to the present invention.

In the case of the present invention, the density of the film is not lower than 1.80 g/cm$^3$. It is desirable that the density of the film be 1.80 to 2.89 g/cm$^3$, and it is far more desirable that the density of the film be 1.85 to 2.89 g/cm$^3$. In a case where the density of the film is lower than 1.80 g/cm$^3$, the moisture proofness of the film is insufficient. This makes it impossible to obtain the intended film. On the other hand, in a case where the density of the film exceeds 2.89 g/cm$^3$, this increases the amount of a multivalent metal compound to be added, and makes it difficult to work with the post-coated film. The density of the film can be measured in accordance with JIS K7112 (a method of measuring the density and specific gravity of a plastic).

Next, descriptions will be provided for the surface ratio α of infrared absorption spectrum of the film [a peak surface $S_1$ (3700 to 2500 $cm^{-1}$)/a peak surface $S_2$ (1800 to 1500 $cm^{-1}$)].

In the case of the present invention, the surface ratio α of infrared absorption spectrum is used as a substitute for an index for indicating an amount of water contained in the film. Although it is not clear what state the water contained in the film is in, it is supposed that all the water contained in the film is in a state of being adsorbed in the film, and the water is regarded as adsorption water. An O—H stretching vibration stemming from the water exhibits a wide-ranged absorption throughout an infrared wave number range of 3700 to 2500 $cm^{-1}$. With this taken into consideration, the peak surface of infrared absorption spectrum in the range of 3700 to 2500 $cm^{-1}$ is defined as the peak surface $S_1$ (3700 to 2500 $cm^{-1}$) in the case of the present invention. The peak surface $S_1$ (3700 to 2500 $cm^{-1}$) can be found by means of applying a mathematical integration to an area in the range of 3700 to 2500 $cm^{-1}$, where the base line is a straight line joining two points: one point representing absorbance at 3700 $cm^{-1}$; and the other point representing absorbance at 2500 $cm^{-1}$.

In addition, a C=O stretching vibration attributed to a carboxyl group (—COOH) contained in the polycarboxylate-based polymer (A) exhibits a peak in an infrared wave number range of 1800 to 1600 $cm^{-1}$, and the peak has an absorption maximum around 1700 $cm^{-1}$. Furthermore, a C=O stretching vibration attributed to a salt containing the carboxyl group (—COO$^-$) exhibits a peak in an infrared wave number range of 1600 to 1500 $cm^{-1}$, and the peak has an absorption maximum around 1560 $cm^{-1}$.

The peaks attributed to the carboxyl group (—COOH) and the salt containing the carboxyl group (—COO$^-$) are peaks characteristic of the film according to the present invention. For this reason, the surface of the infrared absorption spectrum in the range of 1800 to 1500 $cm^{-1}$, including these peaks, is the peak surface characteristic of the film of the present invention. In the case of the present invention, this surface is defined as the peak surface $S_2$ (1800 to 1500 $cm^{-1}$). The peak surface $S_2$ (1800 to 1500 $cm^{-1}$) can be found by means of applying a mathematical integration to an area in the range of 1800 to 1500 $cm^{-1}$, where the base line is a straight line joining two points: one point representing absorbance at 1800 $cm^{-1}$; and the other point representing absorbance at 1500 $cm^{-1}$.

On the basis of the above description, a ratio of the peak surface $S_1$ (3700 to 2500 $cm^{-1}$) of the infrared absorption spectrum to the peak surface $S_2$ (1800 to 1500 $cm^{-1}$) of the infrared absorption spectrum, or the peak surface $S_1$ (3700 to 2500 $cm^{-1}$) divided by the peak surface $S_2$ (1800 to 1500 $cm^{-1}$), is defined as the surface ratio α of the infrared absorption spectrum. The ratio is used as an index for indicating the amount of water contained in the film. In the case of the present invention, the surface ratio α of the infrared absorption spectrum is not larger than 2.5. It is desirable that the surface ratio α be not smaller than 0.01 but not larger than 2.3. It is more desirable that the surface ratio α be not smaller than 0.01 but not larger than 2.0. The film whose surface ratio α exceeds 2.5 is insufficiently moisture-proof.

Specifically, in the case of the present invention, an infrared absorption spectrum is measured by use of the transmission method, the attenuated total reflectance (ATR) method, the KBr pellet method, the diffused reflection method, the photoacoustic spectrometry (PAS) or the like. Thus, peak areas $S_1$ and $S_2$ in the infrared absorption spectrum are calculated, and the ratio between the two areas is found. Typical conditions for the measurement can be as follows. A laminate obtained by forming a film according to the present invention on a substrate is used as a sample. When the ATR method is employed, KRS-5 (Thallium Bromide-Iodide) is used as an ATR prism, the incident angle is 45 degrees, the resolution is 4 $cm^{-1}$, and the integration is carried out 30 times.

In the case of the present invention, a peak ratio β [a peak ratio $A_1$ (1560 $cm^{-1}$)/a peak $A_2$ (1700 $cm^{-1}$)] in an infrared absorption spectrum of the film is used as an index for indicating an extent of formation of the metal salt between the polycarboxylate-based polymer (A) and the multivalent metal compound (B) in the film. A peak $A_1$ (1560 $cm^{-1}$) constituting a peak ratio β of an infrared absorption spectrum represents an absorption peak surface or peak height of an infrared absorption spectrum of a C=O stretching vibration around 1560 $cm^{-1}$ attributed to a salt containing the carboxyl group (—COO$^-$). In other words, generally, the C=O stretching vibration attributed to the salt containing carboxyl group (—COO$^-$) exhibits an absorption peak in a infrared wave number range of 1600 to 1500 $cm^{-1}$, and the absorption peak has an absorption maximum around 1560 $cm^{-1}$. With regard to the peak $A_1$ (1560 $cm^{-1}$), the peak surface can be found by means of applying a mathematical integration to an area in the range of 1600 to 1500 $cm^{-1}$, and the peak height can be found from the height of the absorption maximum in the range of 1600 to 1500 $cm^{-1}$, where the base line is a straight line joining two points: one point representing absorbance at 1600 $cm^{-1}$; and the other point representing absorbance at 1500 $cm^{-1}$.

In addition, the peak $A_2$ (1700 $cm^{-1}$) constituting the peak ratio β is an infrared absorption peak separate from, and independent of, the peak $A_1$ (1560 $cm^{-1}$), and represents the peak surface or peak height of an infrared absorption spectrum of an C=O stretching vibration around 1700 $cm^{-1}$ attributed to the carboxyl group (—COOH). In other words, generally, the C=O stretching vibration attributed to the carboxyl group (—COOH) exhibits an absorption peak in an infrared wave number range of 1800 to 1600 $cm^{-1}$, and the absorption peak has an absorption maximum around 1700 $cm^{-1}$. With regard to the peak $A_2$ (1700 $cm^{-1}$), the peak surface can be found by means of applying a mathematical integration to an area in the range of 1800 to 1600 $cm^{-1}$, and the peak height can be found from the height of the absorption maximum in the range of 1800 to 1600 $cm^{-1}$, where the base line is a straight line joining two points: one point representing absorbance at 1800 $cm^{-1}$; and the other point representing absorbance at 1600 $cm^{-1}$. The absorbance of the film has a linear relationship with an amount of infrared-active chemical species present in the film. For this reason, when a ratio between the peaks of the infrared absorption spectrum, or the peak $A_1$ (1560 $cm^{-1}$) divided by the peak surface $A_2$ (1700 $cm^{-1}$), is defined as the peak ratio β of the infrared absorption spectrum, the ratio can be used as a substitute for an index for indicating a ratio between the amount of the carboxyl group (—COO$^-$), which has formed the salt along with the multivalent metal in the film, and the amount of the free carboxyl group (—COOH).

The peak ratio β of the infrared absorption spectrum of the film according to the present invention is not lower than 1.2. From the viewpoint of the moisture proofness of the film, however, it is desirable that the peak ratio β be not lower than 2.0. It is more desirable that the peak ratio β be not lower than 4.0.

As well, in a case where a metal compound formed from a monovalent metal is used while mixed in the film according to the present invention as long as the oxygen-gas barrier properties and moisture proofness are not impaired, a C=O stretching vibration attributed to the monovalent metal salt (—COO⁻) of the carboxylic acid exhibits an absorption peak in the infrared wave number range of 1600 to 1500 cm⁻¹, and the absorption peak has an absorption maximum around 1560 cm⁻¹. Accordingly, in this case, the two C=O stretching vibrations are included in the infrared absorption spectrum: one C=O stretching vibration attributed to the monovalent metal salt of the carboxylic acid; and the other C=O stretching vibration attributed to the multivalent metal salt of the carboxylic acid. Even in such case, similarly, the peak ratio β [the peak A₁ (1560 cm⁻¹)/the peak A₂ (1700 cm⁻¹)] is used, as it is, as the index for indicating the ratio between the amount of the multivalent metal salt (—COO⁻) of the carboxyl group and the amount of free carboxyl group (—COOH).

In order to find the peak ratio β, the infrared absorption spectrum can be measured, for example, by use of FT-IR 2000 made by PerkinElmer, Inc.

Specifically, the infrared absorption spectrum of the film according to the present invention is measured by means of the transmission method, the attenuated total reflectance (ATR) method, the KBr pellet method, the diffusion reflectance method, the photoacoustic spectrometry or the like. Thus, the peak heights or peak surfaces of the two infrared absorption spectra are calculated, and the ratio between the two is found.

Typical conditions for the measurement can be as follows. A laminate obtained by forming a film according to the present invention on a substrate is used as a sample. When the ATR method is employed, KRS-5 (Thallium Bromide-Iodide) is used as an ATR prism, the incident angle is 45 degrees, the resolution is 4 cm⁻¹, and the integration is carried out 30 times. For a method of measuring an infrared absorption spectrum by use of FT-IR, you can refer to *FT-IR no Kiso to Jissai* (Basics and Practical Use of FT-IR) edited by Mitsuo Tasumi, for example.

The film according to the present invention is a film exhibiting excellent oxygen-gas barrier properties even at high humidity. It is desirable that the oxygen permeability of the film according to the present invention, which is measured at 30° C. at a relative humidity (RH) of 80% be equal to, or lower than, the oxygen permeability which the polycarboxylate-based polymer (A) constituting the film according to the present invention exhibits at 30° C. at a relative humidity of 0%. Specifically, it is desirable that the oxygen permeability of the film according to the present invention at 30° C. at the relative humidity (RH) of 80% be not higher than 1000 cm³ (STP)/(m²·day·MPa). It is more desirable that the oxygen permeability be not higher than 500 cm³ (STP)/(m²·day·MPa). It is far more desirable that the oxygen permeability be not higher than 100 cm³ (STP)/(m²·day·MPa).

Besides the oxygen-gas barrier properties, the moisture proofness is also a feature of the film of the present invention. The term "moisture proofness" in the present invention refers to a state where the water vapor permeability is not higher than 15 g/(m²·day) in an atmosphere at a temperature of 40° C. and at a relative humidity of 90% on the side which is supplied with water vapor. It is desirable that the water vapor permeability of the film according to the present invention be not higher than 10 g/(m²·day) in the atmosphere. It is more desirable that the water vapor permeability be not higher than 5 g/(m²·day) in the atmosphere. It is the most desirable that that the water vapor permeability be not higher than 3 g/(m²·day) in the atmosphere. It cannot be said that a film for which a value of the water vapor permeability exceeds 15 g/(m²·day) is a film exhibiting an excellent oxygen-gas barrier properties and the moisture proofness which is intended for in the case of the present invention.

No specific restrictions are imposed on the thickness of the film according to the present invention. However, it is desirable that the thickness be in a range of 0.001 μm to 1 mm from viewpoints of easiness to form the film and easiness to handle the film. It is more desirable that the thickness be in a range of 0.01 μm to 100 μm. It is the most desirable that the thickness be in a range of 0.1 μm to 10 μm.

In a case where the thickness of the film is smaller than 0.001 μm, it is difficult to form the film. This makes it impossible to form films in a stable manner. By contrast, in a case where the thickness of the film exceeds 1 mm, it is difficult to apply the film to a substrate. This presents a problem with the manufacture. If the thickness of a film is that large or that small, this makes it impossible to obtain a film which satisfies the requirements of both the oxygen-gas barrier properties and the moisture proofness.

A laminate obtained by arranging a film, which contains at least a multivalent metal salt of the polycarboxylate-based polymer (A), in at least one surface of a substrate (a support) can be cited as an example of a preferable embodiment of the present invention. This laminate is used for the purpose of ensuring that the film according to the present invention is easily formed in the form of a thin film, that the film according to the present invention formed in the form of the thin film is supported by the laminate, and that the gas barrier properties are given to the substrate. No specific restrictions are imposed on materials for the substrate. Metals, glasses, papers, plastics and the like can be used as a material for the substrate. Although metals, glasses and the like in themselves do not permeate a gas, metals, glasses and the like can be used as the material for the substrate for the purpose of making up for the gas barrier properties in defective parts of the substrate. No specific restrictions are imposed on shapes of the substrate. However, a film, a sheet, and a container, such as a bottle, a cup and a tray, can be cited as an example of the form of the substrate.

In a case where the substrate is formed of a plastic material, no specific restrictions are imposed on the type of the plastic material. Specific examples of the plastic material to be used for the substrate include polyolefin-based polymers such as low-density polyethylene, high-density polyethylene, linear low-density polyethylene, polypropylene, poly(4-methyl-pentene), cyclic polyolefins and the like; copolymer of such polyolefin-based polymers; acid-modified products of such polyolefin-based polymers and such copolymers; vinyl-acetate-based copolymers such as polyvinyl acetate, ethylene-vinyl acetate copolymers, saponified ethylene-vinyl acetate copolymers, polyvinyl alcohol and the like; aromatic polyester-based polymers such as polyethylene terephthalate, polybutylene terephthalate, polyethylene naphthalate and the like; copolymers of such aromatic polyester polymers; aliphatic polyester-based polymers such as poly(ε-caprolactone) polyhydroxybutyrate, polyhydroxyvalerate and the like; copolymers of such aliphatic-based polyester polymers; polyamide-based polymers and copolymers thereof, such as nylon 6, nylon 66, nylon 12, nylon 6/66 copolymers, nylon 6/12 copolymers, metaxylene adipamide-nylon 6 copolymers and the like; polyether-based polymers such as polyethersulfone, polyphenylene sulfide, polyphenylene oxide and the like; chlorine-containing polymers and fluorine-containing polymers such as polyvinyl chloride, polyvinylidene chloride, polyvinyl fluoride, polyvinylidene fluoride and the like; copolymers of such chlorine-containing polymers and such fluorine-containing polymers; acrylic-based polymers such as polymethyl acrylate, polyethyl acrylate, polymethyl methacrylate, polyethyl methacrylate, polyacrylonitrile and the like; copolymers of such acrylic-based polymers; polyimide-based polymers; copolymers of such polyimide-based polymers; resins used for coating materials, such as alkyd resin, melamine resin, acrylic resin, nitrocellulose, urethane resin, unsaturated polyester resin, phenolic resin, amino resin, fluorocarbon resin, epoxy resin and the like; and natural polymer compounds such as cellulose, starch, pullulan, chitin, chitosan, glucomannan, agarose, gelatin and the like. An unstretched sheet, a stretched sheet, an unstretched film, a stretched film, or containers such as a bottle, a cup, a tray and a bag, which is formed of one of the aforementioned plastic materials can be used as the support.

Otherwise, the following product can be used as the support. The product is that which is obtained by forming a thin film made of an inorganic compound or a metallic compound, such as silicon oxide, aluminum oxide, aluminum, or silicon nitride, on the surface of, for example, a sheet, a film or a container made of one of the aforementioned plastic materials by means of the vapor deposition method, the sputtering method or the ion plating method. In general, such a thin film made of an inorganic compound or a metallic compound is used for the purpose of giving the gas-barrier properties to the support. However, the gas-barrier properties are likely to be damaged by pinholes or cracks which would occur in the thin film depending on an environment where the support is used, for example, on influence of high-temperature water vapor or hot water. For this reason, by means of laminating the film according to the present invention on the support, the gas-barrier properties can be reinforced.

Next, descriptions will be provided for a method of manufacturing the film according to the present invention. Incidentally, the method will be described giving an example where water is used as a solvent.

In the case of the film according to the present invention, a solution or a dispersant (a coating liquid) is obtained by mixing the polycarboxylate-based polymer (A), the multivalent metal compound (B) and one of a volatile base (C) and an acid (D) with water which is used as a solvent. In this respect, the polycarboxylate-based polymer (A) and the multivalent metal compound (B) which are the raw materials are as described above. The polycarboxylate-based polymer (A) and the multivalent metal compound (B) are likely to react on each other readily in an aqueous solution, and to form heterogenous precipitates. For this reason, in order to obtain a homogenous coating liquid formed from the polycarboxylate-based polymer (A), the multivalent metal compound (B) and water which is used as the solvent, any one of the volatile base (C) and the acid (D) is mixed with the water which is used as the solvent. Ammonia, monomethylamine, monoethylamine, dimethylamine, diethylamine, triethylamine, morpholine, or ethanolamine is used as the volatile base (C). In addition, an inorganic or organic acid, such as hydrochloric acid, acetic acid, sulfuric acid, oxalic acid, citric acid, malic acid, tartaric acid or the like, is used as the acid (D).

An amount of the volatile base (C) necessary for obtaining the dispersant, or the solution (coating liquid) which is a homogenous mixture is one chemical equivalent relative to the carboxyl groups contained in the polycarboxylate-based polymer (A). However, in a case where the multivalent metal compound is an oxide, hydroxide, or carbonate of cobalt, nickel, copper or zinc, addition of the volatile base (C) in an amount not smaller than one chemical equivalent causes the metal contained in the compound to form a complex with the volatile base (C). This makes it possible to obtain the transparent and homogenous solution containing the polycarboxylate-based polymer (A), the multivalent metal compound (B), the volatile base (C) and the water which is the solvent. It is desirable that an amount of the volatile base (C) to be added thereto be not smaller than one chemical equivalent, but not larger than 60 chemical equivalents, relative to all the carboxyl groups in the polycarboxylate-based polymer (A). It is more desirable that the amount be not smaller than two chemical equivalents, but not larger than 30 chemical equivalents. If the added amount is smaller than one chemical equivalent, this makes it difficult to obtain the homogenous solution (coating liquid). By contrast, if the added amount is larger than 60 chemical equivalents, this brings about a problem with manufacture (formation) of the film.

It is desirable that ammonia be used as the volatile base (C).

In a case where the acid (D) is used, it is desirable that an amount of the acid (D) to be added thereto be not smaller than one chemical equivalent, but not larger than 60 chemical equivalents, relative to the carboxyl groups. It is more desirable that the amount be not smaller than two chemical equivalents, but not larger than 30 chemical equivalents. If the added amount is smaller than one chemical equivalent, this makes it difficult to obtain the homogenous solution (coating liquid). By contrast, if the added amount is larger than 60 chemical equivalents, this brings about a problem with manufacture (formation) of the film. It is desirable that hydrochloric acid be used as the acid (D).

Another embodiment of the manufacturing method according to the present invention can be carried out as follows. The polycarboxylate-based polymer (A), the multivalent metal compound (B), the volatile base (C) and ammonium carbonate (E) are mixed with water which is the solvent, and thus the coating liquid is obtained. Then, the coating liquid thus obtained is applied to the substrate, and is dried and treated with heat. Thereby, the film is obtained. Ammonium carbonate (E) is added for the purpose of turning the multivalent metal compound (B) into a state of an ammonium carbonate complex of the multivalent metal, and of thus preparing a homogeneous solution containing the multivalent metal in an amount which is not smaller than one chemical equivalent relative to all the carboxyl groups contained in the polycarboxylate-based polymer (A). It is desirable that ammonium carbonate (E) be added in such an amount relative to the multivalent metal compound (B) that a molar ratio, or the number of moles of ammonium carbonate (E) divided by the number of moles of the multivalent metal compound (B), is in a range of 0.05 to 10. It is more desirable that ammonium carbonate (E) be added in such an amount relative to the multivalent metal compound (B) that the molar ratio is in a range of 1 to 5. If the molar ratio is smaller than 0.05, this makes it difficult to obtain the homogeneous solution (coating liquid) containing the multivalent metal compound in an amount larger than one chemical equivalent relative to all the carboxyl groups contained in the polycarboxylate-based polymer (A). If the molar ratio is larger than 10, this brings about a problem with manufacture (formation) of the film which is intended to be obtained.

Descriptions will be provided for this embodiment of the manufacturing method according to the present invention, giving an example of the coating liquid obtained by using the polycarboxylate-based polymer (A), the multivalent metal compound (B), any one of the volatile base (C) and the acid (D), and water which is used as the solvent. It does not matter that it is thought that the embodiment carried out in the case where ammonium carbonate (E) is used is the same as the embodiment carried out in the case where the acid (D) is used, unless otherwise indicated.

There is no specific sequence in which the raw materials are mixed with one another when the coating liquid is intended to be obtained. Specific examples of the solvent to be used include water, methyl alcohol, ethyl alcohol, isopropyl alcohol, n-propyl alcohol, n-butyl alcohol, n-pentyl alcohol, dimethyl sulfoxide, dimethylformamide, dimethylacetamide, toluene, hexane, heptane, cyclohexane, acetone, methyl ethyl ketone, diethyl ether, dioxane, tetrahydrofuran, ethyl acetate, butyl acetate and the like. It is desirable that water be used as the solvent with the following problems taken into consideration: disposal of waste water during the coating, and likelihood that the solvent remains in the film. For example, polyacrylic acid (obtainable in the form of an aqueous solution) as the polycarboxylate-based polymer (A), ammonia (in the form of an aqueous solution) as the volatile base (C) and zinc oxide (in the form of powder) as the multivalent metal compound (B) are added, in this order, to water which is added as the solvent, and thereafter are mixed with one another by use of an ultrasonic homogenizer. Thereby, the coating liquid can be obtained. The amount of the water which is used as the solvent is adjusted depending on combination of the water with other additives whenever deemed necessary in order that the coating liquid meets coating ability of the coating apparatus. The solvent may be used singly or in combination with the following additives.

In addition to the aforementioned components, a resin, a plasticizer, a stabilizer, a film-forming agent, an anti-blocking agent, an adhesive and the like can be added to the coating liquid whenever deemed necessary. It is desirable that a soluble resin be used while mixed with the solvent to be used, particularly for the purpose of improving dispersibility and coating performance of the multivalent metal compound which exists in excess. Desirable examples of the resin include resins used for coating materials, such as alkyd resin, melamine resin, acrylic resin, nitrocellulose, urethane resin, polyester resin, phenolic resin, amino resin, fluorocarbon resin and epoxy resin. It is desirable that the total amount of the multivalent metal salt of the polycarboxylate-based polymer (A), the multivalent metal compound, the resin and the other additives be in a range of 1 wt. % to 50 wt. % in the coating liquid from a viewpoint of coating suitability.

The coating liquid is applied to the surface of the substrate by means of dipping or spraying, or by use of a coater, a printing machine or a brush. With regard to types of coaters and printing machines as well as coating methods, a gravure coater, a reverse roll coater, a micro-gravure coater, an air knife coater, a dip coater, a bar coater, a comma coater, a die coater and the like which employ a direct gravure method, a reverse gravure method, a kiss reverse gravure method, an offset gravure method or the like can be used.

No specific restrictions are imposed on a method of evaporating and drying the solvent after the coating liquid is applied to the substrate. Examples of the method to be used include a method in which the solvent is dried naturally; a method in which the solvent is dried in an oven whose temperature is set at a predetermined level; and a method in which the solvent is dried by use of a dryer provided to the aforementioned coaters, such as an arch dryer, a floating dryer, a drum dryer, an infrared dryer and the like. Conditions for the drying may be selected arbitrarily, as long as the substrate, the multivalent metal salt of the polycarboxylate-based polymer (A) or the other additives are not damaged by heat.

In a layer formed, on the substrate, from the polycarboxylate-based polymer (A), the multivalent metal compound (B) and any one of the volatile base (C) and the acid (D), the multivalent metal compound (B) exists in the form of unreacted molecules, the multivalent metal salt formed between the multivalent metal compound (B) and the polycarboxylate-based polymer (A), and a metal complex salt formed between the multivalent metal compound (B) and polycarboxylic acid. The "metal complex salt" as mentioned herein means a complex formed between the volatile base and one of cobalt, nickel, copper and zinc. Tetra-ammonium complex of zinc or copper can be cited as specific examples of the metal complex salt.

The film is formed by applying the coating liquid to the surface of the substrate, and drying the coating liquid, in the aforementioned manner. Thereafter, the film is treated with heat at a temperature ranging from 60° C. to 400° C. while the film is being put together with the substrate, or while the film is being separated from the substrate. It is desirable that the film is treated with heat at a temperature ranging from 100° C. to 300° C. It is more desirable that the film is treated with heat at a temperature ranging from 150° C. to 250° C. No specific restrictions are imposed on the heat treatment, as long as the temperature is set in the aforementioned range. In general, it is desirable that the heat treatment be performed with a pressure of 0.1 to 600 MPa in an inert gas atmosphere for a time length of 0.1 to 3000 minutes. It is more desirable that the heat treatment be performed with a pressure of 0.1 to 100 MPa in an inert gas atmosphere for a time length of 1 to 2000 minutes. If the temperature for the heat treatment is higher than 400° C., and if the time length for the heat treatment is longer than 3000 minutes, they make it difficult to obtain a film having the oxygen-gas barrier properties and the moisture proofness which are aimed at. In addition, they bring about a problem from a viewpoint of productivity. If the temperature for the heat treatment is lower than 60° C., and if the time length for the heat treatment is shorter than 0.1 minutes, moisture is not sufficiently removed, and accordingly a problem is likely to occur from the viewpoint of the moisture proofness in particular.

No specific restrictions are imposed on the method of performing the heat treatment. A thermal history may be given through raising the temperature for the heat treatment gradually by means of changing in the temperature a plurality of times. No specific restrictions are imposed on the heat treatment apparatus. For example, the heat treatment can be carried out by use of an oven under normal pressure, or by use of an autoclave, press machine or continuous heating apparatus under pressure. For the purpose of removing the volatile base (C), the film may be treated by water vapor in an autoclave before the heat treatment. It is desirable that the pressure be 0.1 to 1 MPa, and that the temperature be 100 to 400° C. It is more desirable that the pressure be 0.15 to 0.8 MPa, and that the temperature be 110 to 300° C. It is the most desirable that the pressure be 0.2 to 0.6 MPa, and that the temperature be 120 to 200° C. After the film is treated by water vapor in the autoclave, the heat treatment may be performed. Otherwise, the drying and the heat treatment may be performed continuously. Examples of the method of performing the heat treatment include a hot-air jet method, an air-floating method, an infrared method, a micro-wave method, a dielectric-heat method and the like. The density of a film to be obtained can be adjusted by the conditions for the heat treatment and the conditions for the treatment using water vapor. Incidentally, after the heat treatment is completed, the volatile base (C), the acid (D), or ammonium carbonate (E) is vaporized. Even though the volatile base (C), the acid (D) and ammonium carbonate (E) otherwise leave traces in the form of salt in the film, the performance of the film is not adversely affected.

With regard to the film which has undergone the heat treatment, it is found that the surface ratio $\alpha$ and the peak ratio $\beta$ of the infrared absorption spectrum, the film density, the oxygen permeability and the water vapor permeability fall within the respective ranges aforementioned, and that accordingly the oxygen-gas barrier properties and the moisture proofness become excellent. In addition, the thickness of the film also falls within the aforementioned range.

The laminate according to the present invention may be a laminate which is obtained by arranging the film in at least one surface of the substrate (support), and which include superposed layers in addition to the substrate. No specific restrictions are imposed on the materials for the arbitrary layer. However, the materials are selected from the plastic materials which have been cited as the examples of the materials for the substrate. For example, one or more layers can be laminated in accordance with the purpose of providing a multilayered film or sheet with strength, sealability, easiness with which the film or sheet is opened while used as a seal, good appearance, light-blocking properties, moisture proofness, or the like. Examples of the laminating method include a method of laminating a layer material by means of coating the multilayered film or sheet with the layer material, and a method of laminating a layer material in the form of a film or a sheet with or without use of an adhesive through a publicly-known lamination method. Specific examples of the lamination method include a dry lamination method, a wet lamination method, and an extrusion lamination method. Properties of the laminate, such as the oxygen permeability and the water vapor permeability, is not inferior to those of a single film containing, as a chief component, the multivalent metal salt of the polycarboxylate-based polymer (A). Accordingly, a laminate to which another function is added in accordance with purposes can be provided.

The film and the laminate according to the present invention can be made into a packaging bag and a packaging container by means of applying a forming process, such as bag making, to the film and the laminate in the form of a film or sheet. Specific examples of the form of the packaging material include a flat pouch, a standing pouch, a pouch having a nozzle, a pillow bag, a gazette bag, a shell-shaped packaging bag. If the configuration of the materials for the laminated film is arbitrarily selected, such a packaging material can be used while provided with easiness-to-open, easiness-to-tear, contraction and expansion properties, microwavability, UV-blocking properties, good appearance and the like. Specific examples of the form of the packaging container include a bottle, a tray, a cup, a tube as well as a lid material and an opening-sealing material for such a packaging container. Similarly, the packaging container can be used while provided with easiness-to-open, easiness-to-tear, contraction and expansion properties, microwavability, UV-blocking properties, good appearance and the like, if the configuration of the materials for the laminate is arbitrarily selected.

The film and the laminate according to the present invention are suitable as packaging materials, packaging containers and vacuum heat-insulating materials for foods, beverages, chemicals, pharmaceuticals and precision metal parts such as electronic parts, all of which are susceptible to deterioration stemming from influence of moisture, oxygen and the like. In addition, the film and the laminate according to the present invention can be suitably used as packaging materials for articles which require stable oxygen-gas barrier properties for a long time, and which need to be treated under conditions of high-temperature hot water, including boil and retort sterilization. Specific examples of the articles which require a treatment, such as boil and retort sterilization, under conditions of high-temperature hot water include seasoned foods such as curry, stew and pasta source; seasoning mixes such as premixes for Chinese food; baby foods; cooked rice; rice gruel; cooked foods for toaster ovens and microwave ovens; soups; desserts; agricultural products; and livestock products. Examples of the agricultural products include foods to be heat-cooked while retorted or boiled for sterilization, such as grains (e.g., potatoes, sweet potatoes, corn, chestnuts and beans), vegetables (asparagus, broccolis, cabbages, bamboo shoots and tomatoes), root vegetables (e.g., radishes, carrots, yams, burdocks and lotus roots), mushrooms and fruits (e.g., apples and pineapples). Examples of the livestock products include sausages and hams.

Metals, metal foils and glass have been so far used as highly moisture-proof materials. However, it is expected that films and laminates according to the present invention, that is, moisture-proof, transparent and flexible films and laminates which have gas barrier properties, will be used as packaging materials and members of electronic equipment.

EXAMPLES

Next, detailed descriptions will be provided for the present invention by giving examples. However, the present invention is not limited to these examples. Evaluation methods will be described as follows.

1. A Surface Ratio α of an Infrared Absorption Spectrum (A Method of Measuring the Amount of Moisture in a Film)

In these examples, a surface ratio α [a peak surface $S_1$ (3700 to 2500 cm$^{-1}$)/a peak surface $S_2$ (1800 to 1500 cm$^{-1}$)] was found by use of the ATR method, which was selected from the aforementioned methods.

In this respect, the peak surface $S_1$ (3700 to 2500 cm$^{-1}$) was found by means of applying a mathematical integration to an area in the range of 3700 to 2500 cm$^{-1}$, where the base line was a straight line joining two points: one point representing absorbance at 3700 cm$^{-1}$; and the other point representing absorbance at 2500 cm$^{-1}$. The peak surface $S_2$ (1800 to 1500 cm$^{-1}$) was found by means of applying a mathematical integration to an area in the range of 1800 to 1500 cm$^{-1}$, where the base line was a straight line joining two points: one point representing absorbance at 1800 cm$^{-1}$; and the other point representing absorbance at 1500 cm$^{-1}$.

2. A Peak Ratio β of an Infrared Absorption Spectrum (A Method of Measuring a Degree of Ionization)

In these examples, a peak ratio β of [a peak $A_1$ (1560 cm$^{-1}$)/a peak $A_2$ (1700 cm$^{-1}$)] was found on the basis of a peak height of an infrared absorption spectrum of a film by use of the ATR method, which was selected from the aforementioned methods.

In this respect, absorbance at the peak $A_1$ (1560 cm$^{-1}$) was found on the basis of a height of an absorption maximum in a range of 1600 to 1500 cm$^{-1}$, where the base line was a straight line joining two points: one point representing absorbance at 1600 cm$^{-1}$; and the other point representing absorbance at 1500 cm$^{-1}$. Absorbance at the peak $A_2$(1700 cm$^{-1}$) was found on the basis of a height of an absorption maximum in a range of 1800 to 1600 cm$^{-1}$, where the base line was a straight line joining two points: one point representing absorbance at 1800 cm$^{-1}$; and the other point representing absorbance at 1600 cm$^{-1}$.

3. A Method of Measuring Oxygen Permeability

Oxygen permeability of a film was measured by use of OX-TRAN™ Model 2/20, which was an oxygen permeation instrument made by MOCON Inc. under conditions where the temperature and the relative humidity were 30° C. and 80% (RH) respectively. The measuring method was governed by B method (an equal-pressure method) of JIS K-7126 and ASTM D3985-81, and a measured value was denominated by a unit of cm$^3$ (STP)/(m$^2$·day·MPa). In this respect, "(STP)" means standard conditions (0° C. and 1 atm) for specifying the volume of oxygen. In these examples, the oxygen permeability was measured by use of the equal-pressure method).

4. A Method of Measuring Density

The density was measured by use of the D method (measuring methods using a density-gradient tube) specified by JIS K-7112 (a method of measuring the density and the specific gravity of a plastic).

Fluids used for the density-gradient tube were as follows: carbon tetrachloride/1,3-dibromopropane (the density range: 1.60 to 1.99 g/cm³), 1,3-dibromopropane/ethylene bromide (the density range: 1.99 to 2.18 g/cm³), and ethylene bromide/bromoform (the density range: 2.18 to 2.89 g/cm³). The density was measured in a constant temperature bath whose temperature was regulated at 23° C.

5. A Method of Measuring Water Vapor Permeability

The moisture proofness was evaluated by means of measuring the water vapor permeability at a temperature of 40° C. and at a relative humidity of 90% in accordance with the B method (a method using an infrared sensor) specified by JIS K-7129-1992 (methods of testing water vapor permeability of plastic films and sheets: measuring methods using instruments). The measurement was carried out at the relative humidity of 90% (RH) on the side which was supplied with water vapor by use of PERMATRAN, which was one of water vapor permeation instruments made by MOCON Inc. A measured value was denominated by a unit of g/m²·day.

Example 1

Aron™ A-10H (a 25 wt. % aqueous solution with a number average molecular weight of 200,000), which was polyacrylic acid (PAA) made by Toagosei Co., Ltd., was used as the polycarboxylate-based polymer. Aqueous ammonia (a 28 wt. % aqueous solution of ammonia reagent made by Wako Pure Chemical Industries, Ltd.) serving as the volatile base, zinc oxide (a reagent made by Wako Pure Chemical Industries, Ltd.) and distilled water were sequentially added to the aqueous PAA solution, and were mixed together by use of an ultrasonic homogenizer. Thereby, a coating liquid having the below-mentioned formulation was obtained. The zinc oxide completely dissolved in the coating liquid through formation of a complex between the volatile base (ammonia) and zinc. Accordingly, the coating liquid became a transparent and homogeneous solution.

| (Formulation of the Coating Liquid) | |
|---|---|
| 25 wt. % aqueous PAA solution | 250 g |
| 28 wt. % aqueous ammonia solution | 210 g |
| zinc oxide | 21 g |
| distilled water | 519 g |
| total | 1,000 g |

In the aforementioned formulation of the coating liquid, the amounts of ammonia and zinc oxide were respectively 400 mol % (4.0 chemical equivalents) and 30 mol % (0.6 chemical equivalent) relative to the total amount of carboxyl groups in the PAA. The PAA concentration was 6.25 wt. %. The coating liquid thus obtained was applied to the surface of an oriented polyethylene terephthalate film (a PET film: Lumirror S-10 with a thickness of 12 μm made by Toray Industries, Inc.) by use of a bar coater (K303 PROOFER™ made by RK Print Coat Instrument Ltd.). The coating liquid thus applied was dried by use of a drier. The film obtained by the drying was treated with heat at 200° C. in an oven for 60 minutes. The thickness of the coated layer was 1.0 μm. With regard to the laminate thus obtained, the surface ratio α [the peak surface $S_1$ (3700 to 2500 cm⁻¹)/the peak surface $S_2$ (1800 to 1500 cm⁻¹)], the peak ratio β [the peak $A_1$ (1560 cm⁻¹)/the peak surface $A_2$ (1700 cm⁻¹)], the oxygen permeability and the water vapor permeability were measured and evaluated. Subsequently, the coated layer was separated from the PET film. Then, the density of the coated layer was measured and evaluated. The results are shown in Table 1.

Example 2

A laminate was produced in the same manner as the laminate of Example 1 was produced, except that the amount of zinc oxide contained in the formulation of the coating liquid was changed to the amount as shown below. The laminate thus obtained was evaluated in the same manner as the laminate of Example 1 was evaluated.

| (Formulation of the Coating Liquid) | |
|---|---|
| 25 wt. % aqueous PAA solution | 250 g |
| 28 wt. % aqueous ammonia solution | 210 g |
| zinc oxide | 35 g |
| distilled water | 505 g |
| total | 1,000 g |

In the aforementioned formulation of the coating liquid, the amounts of ammonia and zinc oxide were respectively 400 mol % (4.0 chemical equivalents) and 50 mol % (1.0 chemical equivalent) relative to the total amount of carboxyl groups in the PAA. The PAA concentration was 6.25 wt. %.

Example 3

A laminate was produced in the same manner as the laminate of Example 2 was produced, except that, with regard to the conditions for the heat treatment, the temperature and the length of time were changed to 200° C. and 30 minutes respectively. The laminate thus obtained was evaluated in the same manner as the laminate of Example 1 was evaluated.

Example 4

A laminate was produced in the same manner as the laminate of Example 2 was produced, except that, with regard to the conditions for the heat treatment, the temperature and the length of time were changed to 200° C. and 15 minutes respectively. The laminate thus obtained was evaluated in the same manner as the laminate of Example 1 was evaluated.

Example 5

A laminate was produced in the same manner as the laminate of Example 2 was produced, except that, with regard to the conditions for the heat treatment, the temperature and the length of time were changed to 150° C. and 60 minutes respectively. The laminate thus obtained was evaluated in the same manner as the laminate of Example 1 was evaluated.

Example 6

A laminate was produced in the same manner as the laminate of Example 2 was produced, except that, with regard to the conditions for the heat treatment, the temperature and the length of time were changed to 100° C. and 60 minutes respectively. The laminate thus obtained was evaluated in the same manner as the laminate of Example 1 was evaluated.

Example 7

A laminate was produced in the same manner as the laminate of Example 1 was produced, except that the following formulation of the coating liquid was used in lieu of the formulation of the coating liquid of Example 1. The laminate thus obtained was evaluated in the same manner as the laminate of Example 1 was evaluated.

| (Formulation of the Coating Liquid) | |
|---|---|
| 25 wt. % aqueous PAA solution | 250 g |
| 28 wt. % aqueous ammonia solution | 210 g |
| copper oxide | 34 g |
| distilled water | 506 g |
| total | 1,000 g |

In Example 7, copper oxide (a reagent made by Wako Pure Chemical Industries, Ltd.) was used as the multivalent metal compound. In the aforementioned formulation of the coating liquid, the amounts of ammonia and copper oxide were respectively 400 mol % (4.0 chemical equivalents) and 50 mol % (1.0 chemical equivalent) relative to the total amount of carboxyl groups in the PAA. The PAA concentration was 6.25 wt. %. The coating liquid thus obtained was transparent and homogeneous.

Example 8

A laminate was produced in the same manner as the laminate of Example 1 was produced, except that the following formulation of the coating liquid was used in lieu of the formulation of the coating liquid of Example 1. The laminate thus obtained was evaluated in the same manner as the laminate of Example 1 was evaluated.

| (Formulation of the Coating Liquid) | |
|---|---|
| 25 wt. % aqueous PAA solution | 250 g |
| 28 wt. % aqueous ammonia solution | 210 g |
| copper oxide | 17 g |
| zinc oxide | 17.5 g |
| distilled water | 505.5 g |
| total | 1,000 g |

In Example 8, copper oxide and zinc oxide (reagents made by Wako Pure Chemical Industries, Ltd.) were used as the multivalent metal compounds while mixed with each other. In the aforementioned formulation of the coating liquid, the amounts of ammonia, copper oxide, and zinc oxide were respectively 400 mol % (4.0 chemical equivalents), 25 mol % (0.5 chemical equivalents), and 25 mol % (0.5 chemical equivalents) relative to the total amount of carboxyl groups in the PAA. The PAA concentration was 6.25 wt. %. The coating liquid thus obtained was transparent and homogeneous.

Example 9

A laminate was produced in the same manner as the laminate of Example 1 was produced, except that ammonium carbonate was added to the formulation of the coating liquid of Example 1. The laminate thus obtained was evaluated in the same manner as the laminate of Example 1 was evaluated.

| (Formulation of the Coating Liquid) | |
|---|---|
| 25 wt. % aqueous PAA solution | 250 g |
| 28 wt. % aqueous ammonia solution | 210 g |
| zinc oxide | 21 g |
| ammonium carbonate | 90 g |
| distilled water | 429 g |
| total | 1,000 g |

In the aforementioned formulation of the coating liquid, the amounts of ammonia and zinc oxide were respectively 400 mol % (4.0 chemical equivalents) and 30 mol % (0.6 chemical equivalents) relative to the total amount of carboxyl groups in the PAA. The molar ratio of ammonium carbonate to zinc oxide was 3.6. The PAA concentration was 6.25 wt. %. The coating liquid thus obtained was transparent and homogeneous.

Example 10

A laminate was produced in the same manner as the laminate of Example 9 was produced, except that the formulation of the coating liquid of Example 9 was changed to the following formulation by means of increasing the amount of zinc oxide contained in the coating liquid. The laminate thus obtained was evaluated in the same manner as the laminate of Example 9 was evaluated.

| (Formulation of the Coating Liquid) | |
|---|---|
| 25 wt. % aqueous PAA solution | 250 g |
| 28 wt. % aqueous ammonia solution | 210 g |
| zinc oxide | 35 g |
| ammonium carbonate | 150 g |
| distilled water | 355 g |
| total | 1,000 g |

In the aforementioned formulation of the coating liquid, the amounts of ammonia and zinc oxide were respectively 400 mol % (4.0 chemical equivalents) and 50 mol % (1.0 chemical equivalent) relative to the total amount of carboxyl groups in the PAA. The molar ratio of ammonium carbonate to zinc oxide was 3.6. The PAA concentration was 6.25 wt. %. The coating liquid thus obtained was transparent and homogeneous.

Example 11

A laminate was produced in the same manner as the laminate of Example 9 was produced, except that the formulation of the coating liquid of Example 9 was changed to the following formulation by means of increasing the amount of zinc oxide contained in the coating liquid. The laminate thus obtained was evaluated in the same manner as the laminate of Example 9 was evaluated.

| (Formulation of the Coating Liquid) | |
|---|---|
| 25 wt. % aqueous PAA solution | 250 g |
| 28 wt. % aqueous ammonia solution | 210 g |
| zinc oxide | 52.5 g |
| ammonium carbonate | 224 g |
| distilled water | 263.5 g |
| total | 1,000 g |

In the aforementioned formulation of the coating liquid, the amounts of ammonia and zinc oxide were respectively 400 mol % (4.0 chemical equivalents) and 75 mol % (1.5 chemical equivalents) relative to the total amount of carboxyl groups in the PAA. The molar ratio of ammonium carbonate to zinc oxide was 3.6. The PAA concentration was 6.25 wt. %. The coating liquid thus obtained was transparent and homogeneous.

Example 12

A laminate was produced in the same manner as the laminate of Example 9 was produced, except that the formulation of the coating liquid of Example 9 was changed to the following formulation by means of increasing the amount of zinc oxide contained in the coating liquid. The laminate thus obtained was evaluated in the same manner as the laminate of Example 9 was evaluated.

| (Formulation of the Coating Liquid) | |
|---|---|
| 25 wt. % aqueous PAA solution | 250 g |
| 28 wt. % aqueous ammonia solution | 210 g |
| zinc oxide | 70 g |
| ammonium carbonate | 300 g |
| distilled water | 420 g |
| total | 1,000 g |

In the aforementioned formulation of the coating liquid, the amounts of ammonia and zinc oxide were respectively 400 mol % (4.0 chemical equivalents) and 100 mol % (2.0 chemical equivalents) relative to the total amount of carboxyl groups in the PAA. The molar ratio of ammonium carbonate to zinc oxide was 3.6. In addition, the PAA concentration was 6.25 wt. %. The coating liquid thus obtained was transparent and homogeneous.

Example 13

A laminate was produced in the same manner as the laminate of Example 9 was produced, except that the formulation of the coating liquid of Example 9 was changed to the following formulation by means of increasing the amount of zinc oxide contained in the coating liquid. The laminate thus obtained was evaluated in the same manner as the laminate of Example 9 was evaluated.

| (Formulation of the Coating Liquid) | |
|---|---|
| 25 wt. % aqueous PAA solution | 250 g |
| 28 wt. % aqueous ammonia solution | 210 g |
| zinc oxide | 140 g |
| ammonium carbonate | 300 g |
| distilled water | 100 g |
| total | 1,000 g |

In the aforementioned formulation of the coating liquid, the amounts of ammonia and zinc oxide were respectively 400 mol % (4.0 chemical equivalents) and 200 mol % (4.0 chemical equivalents) relative to the total amount of carboxyl groups in the PAA. The molar ratio of ammonium carbonate to zinc oxide was 3.6. The PAA concentration was 6.25 wt. %. The coating liquid thus obtained was transparent and homogeneous.

Example 14

A laminate was produced in the same manner as the laminate of Example 12 was produced, except that the laminate obtained by drying a coating liquid in the same manner as the coating liquid of Example 12 was dried was treated by steam in an autoclave at 120° C. under a steam atmosphere of 1 kg/cm$^2$ for 30 minutes. This laminate was evaluated.

Example 15

A laminate was produced in the same manner as the laminate of Example 1 was produced, except that the formulation of the coating liquid as shown below was used. The laminate thus produced was evaluated.

| (Formulation of the Coating Liquid) | |
|---|---|
| 25 wt. % aqueous PAA solution | 250 g |
| 30 wt. % hydrochloric acid solution | 126 g |
| zinc oxide | 70 g |
| distilled water | 554 g |
| total | 1,000 g |

In the aforementioned formulation of the coating liquid, the amount of zinc oxide was 100 mol % (2.0 chemical equivalents) relative to the total amount of carboxyl groups in the PAA. The PAA concentration was 6.25 wt. %. The coating liquid thus obtained was transparent and homogeneous.

Comparative Example 1

Laminates were produced in the same manners as the laminates of Example 1 to 15 were produced except that the laminates were not treated with heat. The density, the surface ratio α of the infrared absorption spectrum and the water vapor permeability of each of those laminates were evaluated. The results were shown in Table 1.

Comparative Example 2

A laminate was produced in the same manner as the laminate of Example 1, except that the formulation of the coating liquid as shown below was used for the purpose of changing in the amount of zinc oxide contained in the coating liquid. The laminate thus produced was evaluated.

| (Formulation of the Coating Liquid) | |
|---|---|
| 25 wt. % aqueous PAA solution | 250 g |
| 28 wt. % aqueous ammonia solution | 210 g |
| zinc oxide | 15 g |
| distilled water | 525 g |
| total | 1,000 g |

In the aforementioned formulation of the coating liquid, the amounts of ammonia and zinc oxide were respectively 400 mol % (4.0 chemical equivalents) and 21 mol % (0.42 chemical equivalents) relative to the total amount of carboxyl groups in the PAA. The PAA concentration was 6.25 wt. %.

Comparative Example 3

A laminate was produced in the same manner as the laminate of Example 2 was produced, except that, with regard to the conditions for the heat treatment, the temperature and the length of time were changed to 40° C. and 60 minutes respectively. The laminate thus obtained was evaluated.

Reference Example 1

750 g of distilled water was added to 250 g of Aron™ A-10H serving as the polycarboxylate-based polymer. The distilled water and Aron™ A-10H were mixed with each other by use of an ultrasonic homogenizer, and thereby a coating liquid was obtained. Aron™ A-10 was a 25 wt. % aqueous solution with a number average molecular weight of 200,000, and was polyacrylic acid (PAA) made by Toagosei Co., Ltd. The PAA concentration was 6.25 wt. % in the coating liquid. The coating liquid thus obtained was applied to the surface of an oriented polyethylene terephthalate film (a PET film: Lumirror S-10 with a thickness of 12 μm made by Toray Industries, Inc.) by use of a bar coater (K303 PROOFER™ made by RK Print Coat Instrument Ltd.). The coating liquid thus applied was dried by use of a drier. The thickness of the coated layer thus obtained was 1.0 μm. With regard to the laminate thus obtained, the oxygen permeability was evaluated.

Reference Example 2

With regard to the oriented polyethylene terephthalate film (a PET film: Lumirror S-10 with a thickness of 12 μm made by Toray Industries, Inc.), the oxygen permeability was evaluated.

TABLE 1

| | Polycarboxylic Acid (A) | Multivalent Metal Compound (B) | | Type of Volatile Base (C) | Type of Acid (D) | Presence And Absence of Ammonium Carbonate (E) | Peak Ratio β (*1) | Conditions for Heat Treatment |
|---|---|---|---|---|---|---|---|---|
| | | Type | Chemical Equivalent | | | | | |
| Ex. 1 | PAA | ZnO | 0.6 | Ammonia | — | Absent | 1.4 | 200° C. 60 min. |
| Ex. 2 | PAA | ZnO | 1.0 | Ammonia | — | Absent | 8 | " |
| Ex. 3 | PAA | ZnO | 1.0 | Ammonia | — | Absent | 8 | 200° C. 30 min. |
| Ex. 4 | PAA | ZnO | 1.0 | Ammonia | — | Absent | 8 | 200° C. 15 min. |
| Ex. 5 | PAA | ZnO | 1.0 | Ammonia | — | Absent | 8 | 150° C. 60 min. |
| Ex. 6 | PAA | ZnO | 1.0 | Ammonia | — | Absent | 8 | 100° C. 60 min. |
| Ex. 7 | PAA | CuO | 1.0 | Ammonia | — | Absent | 8 | 200° C. 60 min. |
| Ex. 8 | PAA | ZnO + CuO | 0.5 + 0.5 | Ammonia | — | Absent | 8 | " |
| Ex. 9 | PAA | ZnO | 0.6 | Ammonia | — | Present | 1.4 | " |
| Ex. 10 | PAA | ZnO | 1.0 | Ammonia | — | Present | 8 | " |
| Ex. 11 | PAA | ZnO | 1.5 | Ammonia | — | Present | 8 | " |
| Ex. 12 | PAA | ZnO | 2.0 | Ammonia | — | Present | 8 | " |
| Ex. 13 | PAA | ZnO | 4.0 | Ammonia | — | Present | 8 | " |
| Ex. 14 | PAA | ZnO | 2.0 | Ammonia | — | Present | 8 | Steam Treatment & 200° C. 60 min. |
| Ex. 15 | PAA | ZnO | 2.0 | — | Hydrochloric Acid | Absent | 8 | 200° C. 60 min. |
| Comp. Ex. 2 | PAA | ZnO | 0.42 | Ammonia | — | Absent | 0.8 | " |
| Comp. Ex. 3 | PAA | ZnO | 1.0 | Ammonia | — | Absent | 8 | 40° C. 60 min. |
| Ref. Ex. 1 | | PAA | | | | — | — | — |
| Ref. Ex. 2 | | PET Film | | | | — | — | — |

| | | | | | Comp. Ex. 1 (*5) | | |
|---|---|---|---|---|---|---|---|
| | Density | Surface Ratio α (*2) | WVTR (*3) | $O_2TR$ (*4) | Density | Surface Ratio (*2) | WVTR (*3) |
| Ex. 1 | 1.82 | 1.5 | 10 | 50 | 1.72 | 4.0 | 50 |
| Ex. 2 | 1.85 | 1.5 | 1 | 5 | 1.77 | 3.5 | 50 |
| Ex. 3 | 1.85 | 1.5 | 1 | 5 | 1.77 | 3.5 | 50 |
| Ex. 4 | 1.86 | 1.5 | 1 | 5 | 1.77 | 3.5 | 50 |
| Ex. 5 | 1.85 | 1.8 | 1 | 5 | 1.77 | 3.5 | 50 |
| Ex. 6 | 1.85 | 2.0 | 1 | 5 | 1.77 | 3.5 | 50 |
| Ex. 7 | 1.85 | 1.5 | 1 | 5 | 1.77 | 3.5 | 50 |
| Ex. 8 | 1.86 | 1.5 | 1 | 5 | 1.78 | 3.5 | 50 |
| Ex. 9 | 1.82 | 1.5 | 10 | 50 | 1.72 | 4.0 | 50 |
| Ex. 10 | 1.86 | 1.5 | 1 | 5 | 1.77 | 3.5 | 50 |
| Ex. 11 | 2.12 | 1.4 | 1 | 5 | 2.02 | 3.5 | 50 |
| Ex. 12 | 2.20 | 1.3 | 1 | 5 | 2.14 | 5.5 | 50 |

TABLE 1-continued

| | | | | | | | |
|---|---|---|---|---|---|---|---|
| Ex. 13 | 2.40 | 1.3 | 1 | 5 | 2.23 | 6.0 | 50 |
| Ex. 14 | 1.85 | 1.5 | 1 | 5 | 1.74 | 7.0 | 50 |
| Ex. 15 | 1.86 | 1.5 | 1 | 5 | 1.76 | 3.5 | 50 |
| Comp. Ex. 2 | 1.69 | 1.5 | 50 | 100 | 1.69 | 4.0 | 50 |
| Comp. Ex. 3 | 1.77 | 4.0 | 50 | 5 | 1.77 | 4.0 | 50 |
| Ref. Ex. 1 | — | — | — | 300 (*6) | — | — | — |
| Ref. Ex. 2 | — | — | 50 | 1400 | — | — | 50 |

Reference symbols used in the table denote the followings.

Peak Ratio β (*1): a peak ratio β [a peak $A_1$ (1560 cm$^{-1}$)/a peak $A_2$ (1700 cm$^{-1}$)] of an infrared absorption spectrum.

Surface Ratio α (*2): a surface ratio α [a peak surface $S_1$ (3700 to 2500 cm$^{-1}$)/a peak surface $S_2$ (1800 to 1500 cm$^{-1}$)] of an infrared absorption spectrum.

WVTR (*3): Water vapor permeability at 40° C. at a relative humidity of 90%. Unit: g/(m$^2$·day).

$O_2$TR (*4): Oxygen permeability at 30° C. at a relative humidity of 80%. Unit: cm$^3$ (STP)/(m$^2$·day·MPa).

Comparative Example 1 (*5): an example where laminates, which were produced in the same manner as the laminates of Examples 1 to 15 were produced, were not treated with heat.

$O_2$TR (*6) in Reference Example 1: Oxygen permeability at 30° C. at a relative humidity of 0%. Unit: cm$^3$ (STP)/(m$^2$·day·MPa).

INDUSTRIAL APPLICABILITY

The present invention makes it possible to provide a film exhibiting an excellent oxygen-gas barrier properties and an excellent moisture proofness by means of applying a solution containing the polycarboxylate-based polymer (A) and the multivalent metal compound (B) to a substrate, thus obtaining a dried film, and thereafter treating the dried film with heat under predetermined conditions. Accordingly, the present invention makes it possible to provide packaging materials and packaging containers for not only foods which are required not to contact an oxygen gas, but also foods, beverages, chemicals, pharmaceuticals, and precision metal parts such as electronic parts, as well as members of electronic equipment, all of which are required to be protected from moisture.

The invention claimed is:

1. A film comprising at least a multivalent metal salt of a polycarboxylate-based polymer (A), and a multivalent metal in an amount which is in a range of 1 to 5 chemical equivalents relative to all the carboxyl groups contained in the polycarboxylate-based polymer (A), wherein a density of the film is in a range of 1.80 to 2.89 g/cm$^3$, wherein a thickness of the film is in a range of 0.001 um to 1 mm, wherein a surface ratio α [the peak surface $S_1$(3700 to 2500 cm$^{-1}$)/a peak surface $S_2$(1800 to 1500 cm$^{-1}$)] of an infrared absorption spectrum of the film is not larger than 2.5, and wherein a peak ratio β [the peak $A_1$(1560 cm$^{-1}$)/the peak $A_2$(1700 cm$^{-1}$)] of the infrared absorption spectrum is not smaller than 1.2.

2. The film according to claim 1, wherein the polycarboxylate-based polymer (A) is any one of a homopolymer, a copolymer, and a mixture of the homopolymer and the copolymer, which contains at least one type of polymerizable monomer selected from the group consisting of acrylic acid, maleic acid and methacrylic acid.

3. The film according to claim 1, wherein the multivalent metal is a divalent metal.

4. The film according to claim 1, wherein a water vapor permeability of the film is not larger than 15 g/m$^2$·day (at 40° C. at a relative humidity of 90%).

5. The film according to claim 1, wherein an oxygen permeability of the film is not larger than 1000 cm$^3$(STP)/ (m$^2$·day·MPa) (at 30° C. at a relative humidity of 80%).

6. A laminate comprising the film according to claim 1 and a substrate, wherein the film is arranged on at least one surface of the substrate.

7. A method of manufacturing a film, in which a surface ratio α [the peak surface $S_1$(3700 to 2500 cm$^{-1}$)/a peak surface $S_2$(1800 to 1500 cm$^{-1}$)] of an infrared absorption spectrum of the film is not larger than 2.5, a peak ratio β [the peak $A_1$(1560 cm$^{-1}$)/the peak $A_2$(1700 cm$^{-1}$)] of the infrared absorption spectrum of the film is not smaller than 1.2, and a density of the film is in a range of 1.80 to 2.89 g/cm$^3$, a thickness of the film is in a range of 0.001 um to 1 mm, the method comprising the steps of:

applying, to a substrate, any one of a solution and a dispersant (coating liquid) of a mixture containing a polycarboxylate-based polymer (A), a multivalent metal compound (B) in an amount which is in a range of 1 to 5 chemical equivalents relative to all the carboxyl groups contained in the polycarboxylate-based polymer (A), any one of a volatile base (C) and an acid (D), and a solvent;

thus forming a film; and thereafter treating the film with heat at a temperature in a range of 60° C. to 400° C. while being putted together with the substrate or while being separated from the substrate.

8. The method of manufacturing a film according to claim 7, wherein the polycarboxylate-based polymer (A) is any one of a homopolymer, a copolymer, and a mixture of the homopolymer and the copolymer, which contains at least one type of polymerizable monomer selected from the group consisting of acrylic acid, maleic acid and methacrylic acid.

9. The method of manufacturing a film according to claims 7, wherein the multivalent metal compound (B) is a divalent metal compound.

* * * * *